United States Patent [19]

MacDonald, Jr. et al.

[11] Patent Number: 5,809,403
[45] Date of Patent: Sep. 15, 1998

[54] COAXIAL CABLE ASSEMBLY FOR A PORTABLE PHONE

[75] Inventors: James D. MacDonald, Jr., Apex; Yawei Ma, Cary, both of N.C.

[73] Assignee: Erisson Inc., Research Triangle Park, N.C.

[21] Appl. No.: 613,700

[22] Filed: Mar. 11, 1996

[51] Int. Cl.[6] ............................... H04Q 7/32; H04M 1/00
[52] U.S. Cl. ..................... 455/90; 455/90; 455/550; 455/575; 379/433; 379/434
[58] Field of Search .................................. 455/550, 575, 455/90; 379/428, 433, 434; D14/138, 217, 230, 231, 236, 237, 238, 250; 343/878, 881, 882, 757

[56] References Cited

U.S. PATENT DOCUMENTS

| | | | |
|---|---|---|---|
| D. 315,731 | 3/1991 | Watanabe | D14/138 |
| D. 347,221 | 5/1994 | Siddoway | D14/138 |
| 4,845,772 | 7/1989 | Metroka et al. | 379/433 |
| 5,014,346 | 5/1991 | Phillips et al. | 379/433 |
| 5,027,394 | 6/1991 | Ono et al. | 379/434 |
| 5,436,954 | 7/1995 | Nishiyama et al. | 379/434 |
| 5,444,866 | 8/1995 | Cykiert | 455/575 |
| 5,493,702 | 2/1996 | Crowley et al. | 455/90 |
| 5,508,709 | 4/1996 | Krenz et al. | 455/550 |
| 5,548,643 | 8/1996 | Dalgleish et al. | 379/434 |
| 5,598,469 | 1/1997 | Preker | 379/433 |
| 5,629,979 | 5/1997 | Domoleczny | 379/434 |
| 5,636,275 | 6/1997 | Takagi et al. | 379/434 |
| 5,649,306 | 7/1997 | Vanatta | 455/90 |
| 5,657,386 | 8/1997 | Schwanke | 379/433 |
| 5,666,125 | 9/1997 | Luxon et al. | 455/422 |

FOREIGN PATENT DOCUMENTS

| | | |
|---|---|---|
| 0 644 607 A1 | 3/1995 | European Pat. Off. . |
| 2291542 | 7/1995 | United Kingdom . |
| WO 92/09163 | 11/1991 | WIPO .................................. 379/428 |

*Primary Examiner*—Dwayne D. Bost
*Assistant Examiner*—Jean A. Gelin
*Attorney, Agent, or Firm*—James P. Davidson

[57] ABSTRACT

A coaxial cable assembly for connecting at least one antenna element with RF signal circuitry of a portable phone is disclosed. The portable phone includes a base portion in which the RF signal circuitry is located and a flip cover rotatably secured to the base portion in which the antenna elements are located. The flip cover is rotatably secured to the base portion by means of a support bracket assembly. The coaxial cable assembly provides a separate coaxial cable for each antenna element, with a first end thereof being coupled to the antenna element and a second end being coupled to the RF signal circuitry. Each coaxial cable is shaped to extend through the support bracket assembly so as to withstand bend stresses associated with rotation of the flip cover, with certain locations of the coaxial cable being formed to maintain such shape.

32 Claims, 6 Drawing Sheets

COAXIAL CABLE ASSEMBLY FOR A PORTABLE PHONE

BACKGROUND OF THE INVENTION

1. Field of the Invention

The present invention relates to a handheld portable phone having a flip cover rotatably attached to a base portion by means of a support bracket assembly and, more particularly, to a coaxial cable assembly for connecting an antenna system located in the flip cover with RF signal circuitry located within the base portion.

2. Description of Related Art

In a related patent application entitled "Detachable Flip Cover Assembly for a Portable Phone," Ser. No. 08/586,434, a portable phone operable in the dual communication modes of satellite and cellular is disclosed. This portable phone includes a flip cover which is detachably secured to the phone base portion by means of a support bracket assembly. Additionally, because the antenna system for satellite communication is located therein, the flip cover is preferably rotatable about two separate axes with respect to the phone base portion in order to optimize the orientation of such antenna system with an applicable satellite.

While the portable phone of this previously filed application utilizes coaxial cables to connect the antenna system with the RF signal circuitry, it has been found that certain aspects of this coaxial cable assembly require improvement. In particular, because the coaxial cables must extend through the support bracket assembly, and the support bracket assembly must be as small as possible for appearance considerations, a minimum bend radius (and therefore a minimum diameter) for such coaxial cables is desired. At the same time, the coaxial cables should be shaped in such a manner that chafing against edges of the support bracket assembly (which can cause premature failure of the coaxial cables) is prevented. Further, fatigue failures of the cables caused by flexing conditions during the opening and closing cycles of the flip cover need to be reduced.

In light of the foregoing, a primary object of the present invention is to provide a coaxial cable assembly, functioning as an interface between an antenna system located in a flip cover and RF signal circuitry located in the base portion of a portable phone, which overcomes the concerns stated above.

Another object of the present invention is to provide a coaxial cable assembly for connecting antenna elements located in a flip cover with RF signal circuitry located in a base portion of a portable phone, where the flip cover is rotatable with respect to the base portion about two separate axes.

A further object of the present invention is to provide a coaxial cable assembly for connecting antenna elements located in a flip cover with RF signal circuitry located in a base portion of a portable phone, where the flip cover is detachably coupled to the base portion.

Yet another object of the present invention is to provide a coaxial cable assembly for connecting antenna elements located in a flip cover with RF signal circuitry located in a base portion of a portable phone, where the flip cover is fixedly coupled to the base portion.

Still another object of the present invention is to provide a coaxial cable assembly for connecting antenna elements located in a flip cover with RF signal circuitry located in a base portion of a portable phone, where the size of a support bracket assembly rotatably securing the flip cover to the base portion is minimized.

Another object of the present invention is to provide a coaxial cable assembly for connecting antenna elements located in a flip cover with RF signal circuitry located in a base portion of a portable phone, where each coaxial cable thereof has a minimum bend radius for passing through the interior of a support bracket assembly.

A still further object of the present invention is to provide a coaxial cable assembly for connecting antenna elements located in a flip cover with RF signal circuitry located in a base portion of a portable phone, where each coaxial cable thereof is shaped in order to sustain the bending stresses associated with rotation of the flip cover.

Yet another object of the present invention is to provide a coaxial cable assembly for connecting antenna elements located in a flip cover with RF signal circuitry located in a base portion of a portable phone, where each coaxial cable thereof is heat formed at certain non-linear locations in order to reduce RF leakage and prevent kinking.

These objects and other features of the present invention will become more readily apparent upon reference to the following description when taken in conjunction with the following drawing.

SUMMARY OF THE INVENTION

In accordance with one aspect of the present invention, a coaxial cable assembly for connecting at least one antenna element with RF signal circuitry of a portable phone is disclosed. The portable phone includes a base portion in which the RF signal circuitry is located and a flip cover rotatably secured to the base portion in which the antenna elements are located. The flip cover is rotatably secured to the base portion by means of a support bracket assembly. The coaxial cable assembly provides a separate coaxial cable for each antenna element, with a first end thereof being coupled to the antenna element and a second end being mated with a connector coupled to the RF signal circuitry. Each coaxial cable is shaped to extend through the support bracket assembly so as to withstand bend stresses associated with rotation of the flip cover, with certain locations of the coaxial cable being heat formed to maintain such shape.

BRIEF DESCRIPTION OF THE DRAWING

While the specification concludes with claims particularly pointing out and distinctly claiming the present invention, it is believed that the same will be better understood from the following description taken in conjunction with the accompanying drawing in which:

DETAILED DESCRIPTION OF THE INVENTION

Figure 1:
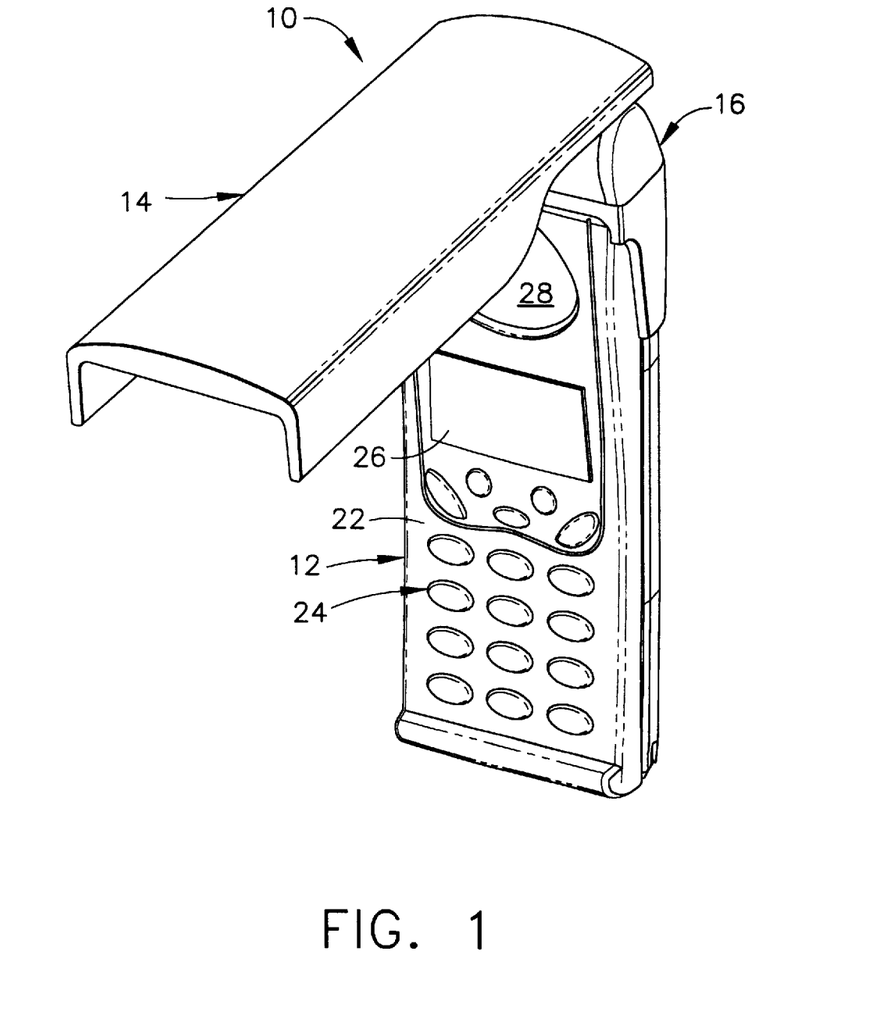
FIG. 1 is a perspective view of a portable phone in accordance with a patent application entitled "Detachable Flip Cover Assembly for a Portable Phone," Ser. No. 08/586,434, where the flip cover has been rotated partially open about a first axis.
Figure 2:
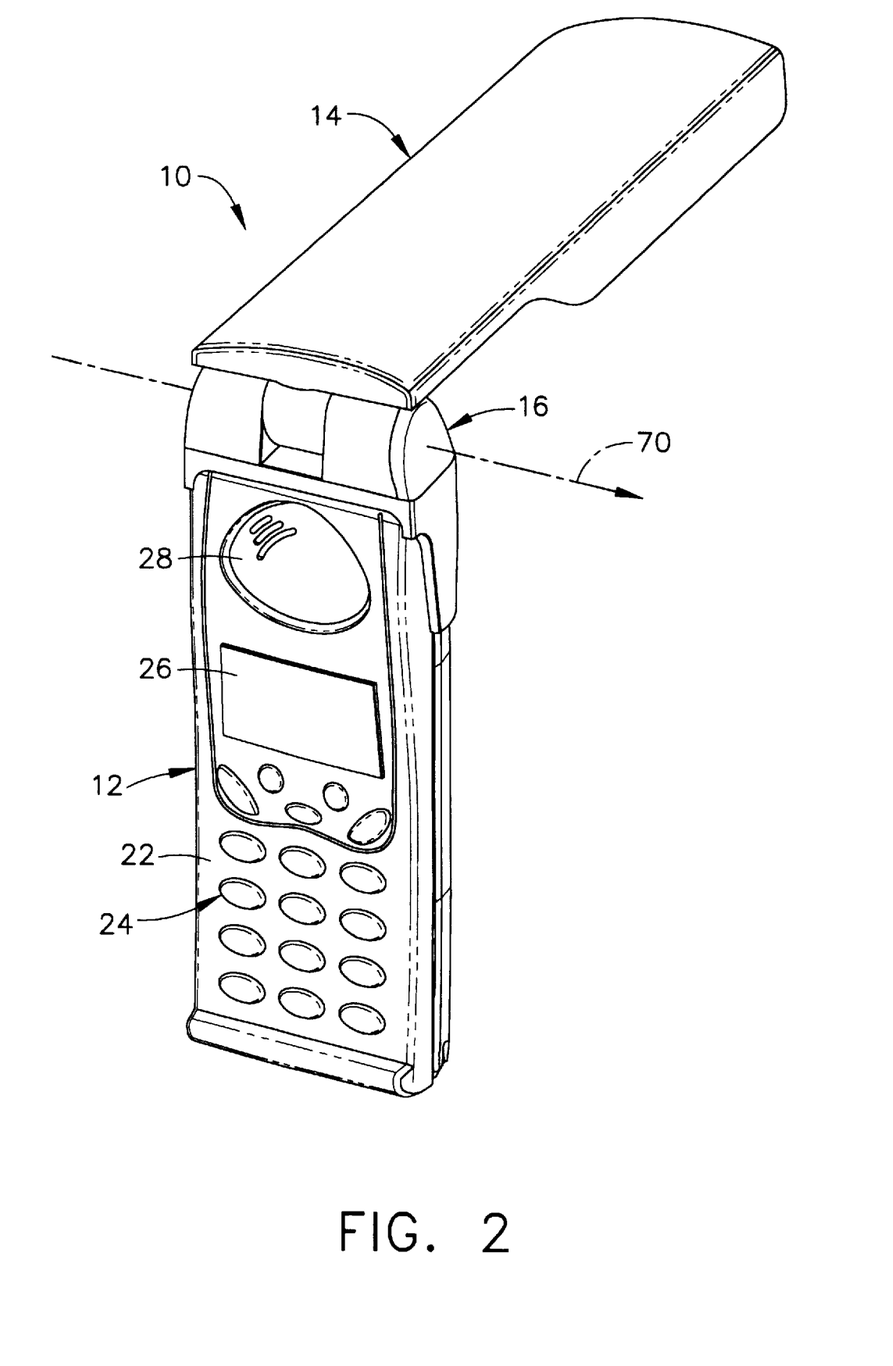
FIG. 2 is a perspective view of the portable phone depicted in FIG. 1, where the flip cover has been rotated sideways about a second axis.
Figure 3:
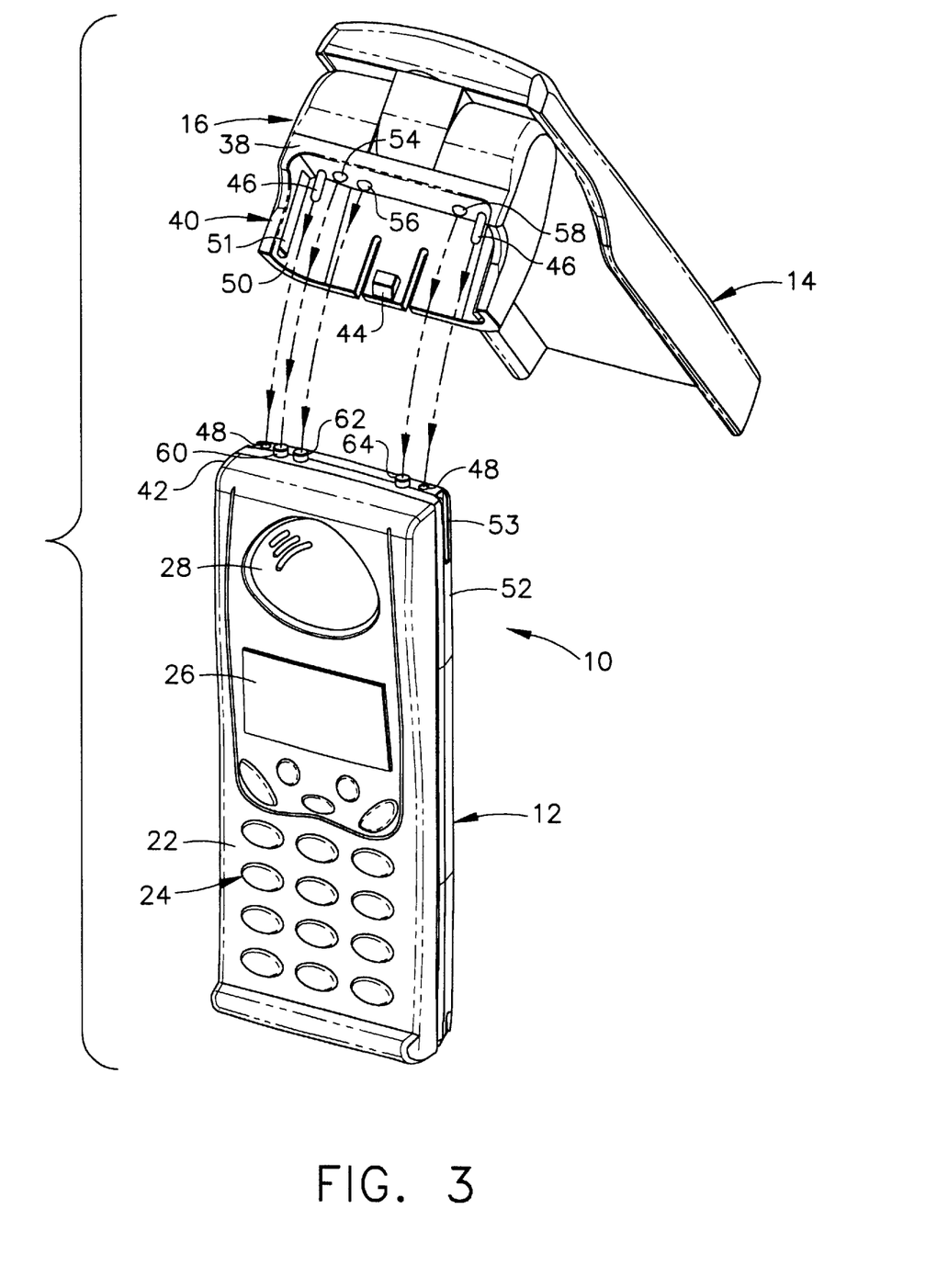
FIG. 3 is an exploded, perspective view of the portable phone depicted in FIGS. 1 and 2, where the support bracket assembly and flip cover have been removed from the main housing.
Figure 4:
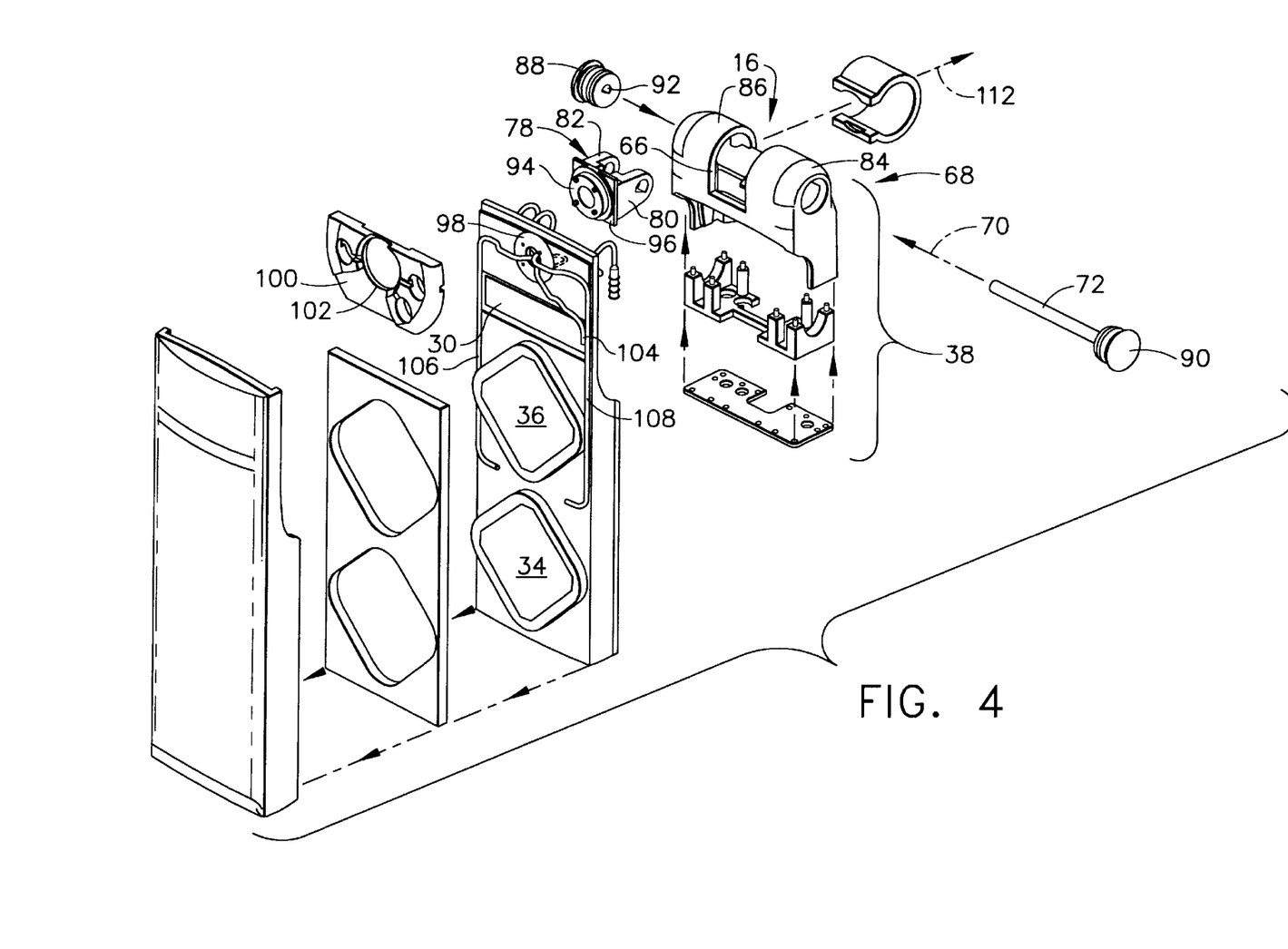
FIG. 4 is an exploded, perspective view of the flip cover and support bracket assembly depicted in FIGS. 1–3, including the coaxial cable assembly of the present invention.

Referring now to the drawing in detail, wherein identical numerals indicate the same elements throughout the figures, FIGS. 1 and 2 depict a handheld portable phone capable of operating in the dual modes of cellular and satellite communication and is indicated generally by the numeral 10. Portable phone 10, as shown in FIGS. 1–4, has essentially the same configuration as that shown and described in a patent application entitled "Detachable Flip Cover Assembly for a Portable Phone," Ser. No. 08/586,434, which is also owned by the assignee of the present invention and is hereby incorporated by reference.

It will therefore be seen that portable phone 10 includes a main housing 12 and a flip cover 14 which are interconnected by means of a support bracket assembly indicated generally by the numeral 16. It will be noted from FIGS. 1 and 2 that a top surface 22 of main housing 12 offers access to a keypad 24, a display 26, and a speaker 28. Also, while not shown, it will be understood that main housing 12 includes RF signal circuitry therein enabling portable phone 10 to communicate in both the cellular and satellite modes of communication, such as shown and described in a patent application entitled "Dual Mode Satellite/Cellular Terminal," Ser. No. 08/501,565, which is owned by the assignee of the present invention and hereby incorporated by reference.

Portable phone 10 further includes a first antenna 30 for receiving and transmitting signals in the cellular mode of communication, first antenna 30 preferably being a printed circuit antenna located on an interior surface of flip cover 14. Of course, first antenna 30 may alternatively be of the wire monopole or dipole type.

With respect to the satellite mode of communication, a second antenna 32 is preferably comprised of a first patch antenna element 34 for transmitting signals to a satellite and a second patch antenna element 36 for receiving signals from a satellite. Nevertheless, a single patch antenna element may be utilized to perform both the transmitting and receiving functions. The construction of flip cover 14 and the mounting of first and second patch antenna elements 34 and 36 is described in greater detail in a patent application entitled "Flip Cover and Antenna Assembly for a Portable Phone," Ser. No. 08/586,432, which is also owned by the assignee of the present invention and is hereby incorporated by reference. In order to minimize interference, first and second patch antenna elements 34 and 36 are tuned to separate frequency bandwidths of operation, depending on those available.

Since the satellite mode of communication involves a directional component, whereby link margin between portable phone 10 and an applicable satellite is improved when second patch antenna element 36 is positioned in alignment therewith, an important aspect of portable phone 10 is to provide a configuration in which second patch antenna element 36 may be maneuvered into position without undue effort. With respect to the coupling of flip cover 14 and main housing 12, one option is disclosed in a patent application entitled "Antenna System for Dual Mode Satellite/Cellular Portable Phone," Ser. No. 08/586,433, which is owned by the assignee of the present invention and is hereby incorporated by reference. However, the manner of directly coupling flip cover 14 and main housing 12 therein does not permit easy detachment so main housing 12 can be positioned within a docking station, car cradle adapter, or other accessory so that the antenna associated with such accessory can be utilized more effectively. In accordance with portable phone 10 depicted in FIGS. 1–6, a support bracket assembly 16 like that in the patent application identified by Ser. No. 08/586,434 is utilized to indirectly couple flip cover 14 and main housing 12.

More specifically, support bracket assembly 16 includes a support bracket 38 having a first slotted portion 40 sized to receive an end 42 of main housing 12 and a latching mechanism 44 (e.g., in the form of a detent) for coupling support bracket 38 to main housing 12. In order to facilitate the coupling of support bracket 38 and main housing 12, first slotted portion 40 of support bracket 38 has at least one guide pin 46 positioned therein (see FIG. 3) which is received within a corresponding opening 48 in main housing 12 and preferably a dovetail type guide located on side surfaces 50 and 52 thereof, respectively. Each dovetail guide includes a male member 51 associated with first slotted portion 40 of support bracket 38 and a complementary female member 53 associated with main housing 12. Coaxial connectors 54, 56, and 58 are also provided within first slotted portion 40 and are the mating ends of coaxial cables 104, 106, and 108 described in greater detail hereinafter. Complementing this arrangement are connectors 60, 62, and 64 retained within and extending from main housing end 42 which are connected to the RF signal circuitry within main housing 12.

Support bracket 38 also includes a second slotted portion 66 (see FIG. 4) at the end opposite first slotted portion 40, where it is rotatably coupled with flip cover 14. This is accomplished by means of a hinge mechanism 68 which enables flip cover 14 to rotate about a first axis 70 running longitudinally through a shaft 72 therein. Shaft 72 extends between a pair of bearings 80 and 82 in a yoke 78, as well as support bracket end portions 84 and 86 located on each side of second slotted portion 66, with the ends thereof being captured by a pair of bearings 88 and 90.

Yoke 78 includes an annular step 94 with an opening therethrough at a middle portion 96. Yoke 78 is then bolted to a collar 98 by means of annular step 94. Collar 98 is also used to capture a cable relief device 100 through an opening 102 therein. Cable relief device 100, in turn, is utilized to receive and properly position coaxial cables 104, 106, and 108 from first antenna 30, first patch antenna element 34, and second patch antenna element 36, respectively. It will be understood that flip cover 14 has an inner member 15 which is captured between annular step 94 of yoke 78 and collar 98, where it is able to rotate about the outer surface of annular step 94 (a second axis 112 being defined through yoke 78 and collar 98. Of course, flip cover 14 must rotate a minimum amount about first axis 70 before it will be able to rotate about second axis 112.

Turning now to the coaxial cable assembly of the present invention, designated generally by the numeral 116, it will be seen that separate coaxial cables 104, 106, and 108 are each coupled at a first end 118, 120, and 122 thereof, respectively, to first antenna 30, first patch antenna element 34, and second patch antenna element 36. It will be understood that coaxial cable first ends 120 and 122 are coupled to a common feed substrate (not shown), but alternatively may be connected directly to first and second patch antenna elements 34 and 36. It is intended that each coaxial cable 104, 106, and 108 extend through and traverse support bracket assembly 38 in order that their respective second ends terminate in coaxial connectors 54, 56, and 58, respectively, which are able to receive corresponding male connectors 62, 64, and 66 located on main housing 12. Optionally, a connector/switch assembly may be utilized as shown and described in a patent application filed concurrently herewith entitled "Antenna Connector for a Handheld Mobile Phone," Ser. No. 08/613,701, which is also owned by the assignee of the present invention and hereby incorporated by reference.

Figures 6, 7:
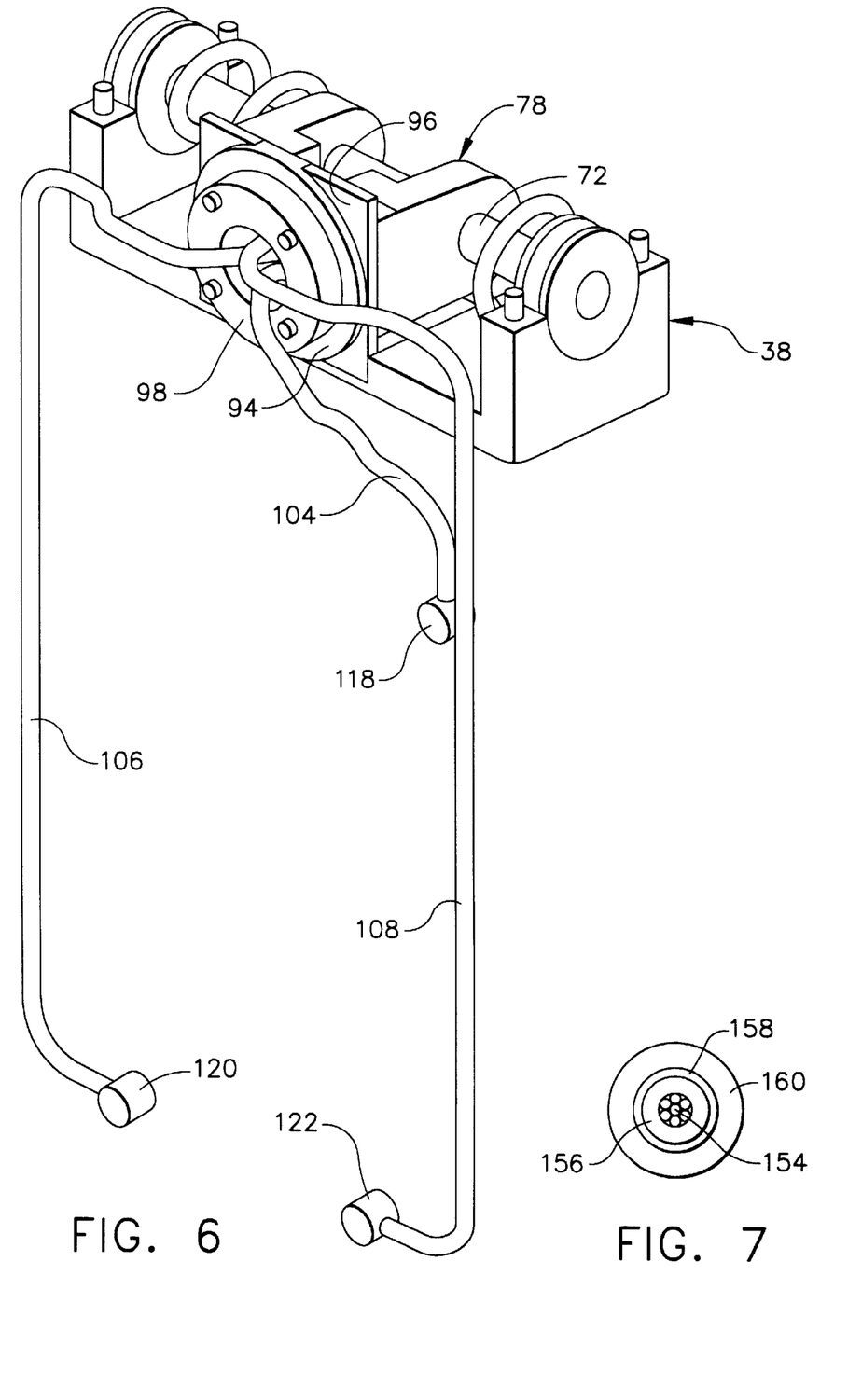
FIG. 6 is a perspective view of the coaxial cable assembly depicted in FIGS. 4 and 5 mounted on the support bracket assembly, where the upper portion of the support bracket assembly housing has been removed for clarity.
FIG. 7 is a cross-sectional view of a coaxial cable utilized in the coaxial cable assembly depicted in FIGS. 4–6.

In order for coaxial cables 104, 106, and 108 to be able to extend through support bracket assembly 38, it will be understood that each such coaxial cable must be shaped so as to be threaded therethrough. More specifically, coaxial cables 104, 106, and 108 preferably extend from their respective first ends 118, 120, and 122 along an interior surface of flip cover 14 and through the openings in collar 98 and yoke middle portion 96 as best seen in FIG. 6. Bends 126 and 128, respectively, are provided in coaxial cables 106 and 108 of approximately 90° so that they may be in substantially direct alignment with the openings in collar 98 and yoke middle portion 96, thereby preventing chafing against the edges thereof. Likewise, coaxial cable 104 includes a similar bend 124 in the range of approximately 90°. In addition, a slight bend or quarter-coil of approximately 45°, designated by the numerals 130, 132, and 134, is preferably provided in coaxial cables 104, 106, and 108 upstream of bends 124, 126, and 128 to provide additional stress relief before entering collar 98 and yoke middle portion 96.

Figure 5:
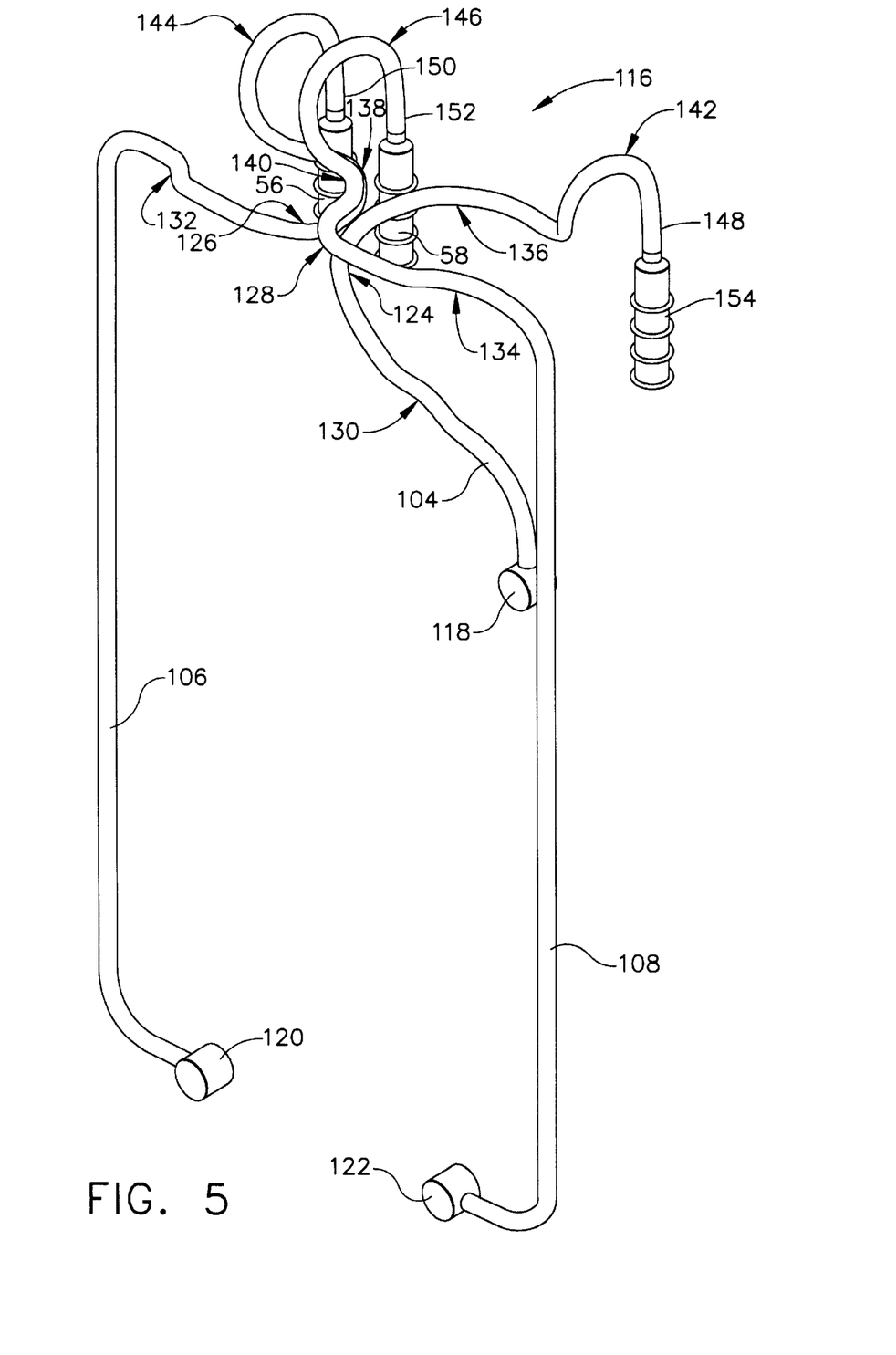
FIG. 5 is a perspective view of the coaxial cable assembly of the present invention.

Thereafter, it will be noted in FIG. 5 that coaxial cables 104, 106, and 108 each include a second bend 136, 138, and 140, respectively, formed therein of approximately 90° where they preferably extend longitudinally adjacent to shaft 72. While coaxial cables 106 and 108 are depicted as being bent in a direction opposite to coaxial cable 104, it should be understood that they may be formed to extend in either direction so long as their complementary mating connector located on main housing 12 is aligned therewith.

After extending adjacent shaft 72 a desired distance, a coil 142, 144, and 146 is then formed in coaxial cables 104, 106, and 108, respectively, around shaft 72 approximately 360° so that second ends 148, 150, and 152 thereof are positioned within first slotted portion 40 where they are attached to coaxial connectors 54, 56, and 58. Once again, a connector/switch may be utilized in conjunction with coaxial cables 104, 106, and 108, where the male portion thereof is integrated with second ends 148, 150, and 152 and the female portion thereof is integrated with connectors 60, 62, and 64.

As seen in FIG. 7, each coaxial cable 104, 106, and 108 preferably includes a conductor portion 154, a dielectric layer 156 around conductor portion 154, a braided outer shielding 158 around dielectric layer 156 for flexibility, and a flexible polymer jacket 160 around braided outer shielding 158 for environmental protection. Because coaxial cables 104, 106, and 108 extend through support bracket assembly 38, which must be as small as possible for appearance considerations, a minimum bend radius (on the order of 3 millimeters) is desired. Accordingly a minimum cable diameter d, is also preferred (currently approximately 1.5 millimeters). It will be noted that the normal ratio of bend radius to cable diameter is approximately 6:1. Bending coaxial cables 104, 106, and 108 to a relatively small bend radius, however, is limited by the tendency for braided outer shielding 158 to expand at the outside of the bend radius (which violates the shield integrity and thus produces leakage) and the tendency for a sharp bend therein to kink (which results in a loss when the characteristic impedance changes).

Therefore, in order to minimize the effects on coaxial cables 104, 106, and 108 associated with sharp bends, it is preferred that such cables undergo heat forming at the bend and coil portions identified above. In this way, outer jacket 160 of each coaxial cable produces a slight shrinkage in the jacket material (e.g., a thermoplastic fluoropolymer such as fluoronated perfluoroethylene propolynome-FEP), which in turn constricts braided outer shielding 158. This has the desired effects of reducing leakage and allowing a much smaller bend radius without kinking the coaxial cable. Heat forming the bends and coils of coaxial cables 104, 106, and 108 also enables such coaxial cables to keep their shape under the continuous opening and closing cycles of flip cover 14, thus minimizing the number of cable restraints required to maintain coaxial cables 104, 106, and 108 in position. Further, by heat forming outer jacket 160 to a neutral position, fatigue failure thereof under the flexing conditions experienced is reduced.

In particular, it has been found that the use of a heat gun having a temperature range of approximately 260°–500° F. may be utilized. While this heat has been applied for approximately 30 seconds for a coaxial cable having a diameter of 1.5 millimeters, the time of application will differ according to the diameter of such coaxial cable, the material utilized for jacket 160, and the like.

Having shown and described the preferred embodiments of the invention, further adaptations of the portable phone and the coaxial cable assembly connecting the antenna elements and RF signal circuitry thereof disclosed herein can be accomplished by one of ordinary skill in the art without departing from the scope of the invention. In particular, while the coaxial cable assembly is described above with respect to a portable phone having a detachable flip cover, it may also be utilized with a portable phone including a flip cover fixedly attached to a phone base portion, such as that shown and described in a patent application entitled "Antenna System for Dual Mode Satellite/Cellular Portable Phone," Ser. No. 08/586,433, which is owned by the assignee of the present invention and hereby incorporated by reference. Of course, it will be seen therein that the flip cover and phone base portion are directly coupled so that no intermediate coaxial connectors are required.

What is claimed is:

1. A coaxial cable assembly for connecting at least one antenna element of an antenna system with RF signal circuitry of a portable handheld phone, said portable phone including a base portion containing said RF signal circuitry and a flip cover containing said antenna element, wherein said flip cover is rotatably secured to said base portion about at least one axis of rotation by means of a support bracket assembly, said coaxial cable assembly comprising an individual coaxial cable for said antenna element connected at a first end to said antenna element and at a second end to said RF signal circuitry, each said coaxial cable including a plurality of non-linear portions maintained therein to neutrally position each said coaxial cable with respect to said rotation axis so as to withstand bend stresses associated with rotation of said flip cover.

2. The coaxial cable assembly of claim 1, wherein said flip cover rotates about two separate axes with respect to said base portion.

3. The coaxial cable assembly of claim 2, wherein said first and second axes of rotation are oriented substantially perpendicular to each other.

4. The coaxial cable assembly of claim 1, wherein said support bracket assembly is slidably and detachably coupled over and to a top portion of said base portion.

5. The coaxial cable assembly of claim 4, wherein each coaxial cable is coupled to said antenna element at a first end and detachably coupled to a connector at a second end, said connector being coupled to said RF signal circuitry.

6. The coaxial cable assembly of claim 1, wherein a plurality of antenna elements are located within said flip cover.

7. The coaxial cable assembly of claim 6, wherein at least one of said antenna elements transmits and receives signals so that said portable phone is able to communicate in a cellular mode.

8. The coaxial cable assembly of claim 6, wherein at least one of said antenna elements transmits and receives signals so that said portable phone is able to communicate in a satellite mode.

9. The coaxial cable assembly of claim 1, wherein a minimum bend radius is maintained for said non-linear portions of each said coaxial cable.

10. A coaxial cable assembly for connecting at least one antenna element of an antenna system with RF signal circuitry of a portable handheld phone, said portable phone including a base portion containing said RF signal circuitry and a flip cover containing said antenna element, wherein said flip cover is rotatably secured to said base portion about at least one axis of rotation by means of a support bracket assembly, said support bracket assembly further comprising:
  (a) a support bracket; and
  (b) a hinge mechanism coupling and flip cover and said support bracket, said hinge mechanism including:
    (1) a yoke having a first bearing at one end, a second bearing at the other end, and a middle portion connecting said first and second bearings having an annular step thereon with an opening therethrough;
    (2) a shaft extending between said first and second yoke bearings; and
    (3) a collar attached to said yoke middle portion having an opening therethrough aligned with said annular step opening through said yoke middle portion, wherein said flip cover is retained between said collar and said yoke to rotate about said annular step;
said coaxial cable assembly comprising an individual coaxial cable for each said antenna element connected at a first end to said antenna element and at a second end to said RF signal circuitry, wherein each said coaxial cable is shaped to traverse said support bracket assembly so as to withstand bend stresses associated with rotation of said flip cover.

11. The coaxial cable assembly of claim 10, wherein a first bend is formed in each said coaxial cable to extend through said collar and annular step openings.

12. The coaxial cable assembly of claim 11, wherein a second bend is formed in each said coaxial cable to extend longitudinally along said shaft extending between said first and second yoke bearings.

13. The coaxial cable assembly of claim 12, wherein a coil is formed in each said coaxial cable to extend around said shaft so that a second end of each said coaxial cable is matable with a connector located on said main housing.

14. The coaxial cable assembly of claim 13, wherein said first bend, said second bend, and said coil in each said coaxial cable is heat formed.

15. The coaxial cable assembly of claim 13, wherein said coil in each said coaxial cable accommodates rotation of said flip cover about a first axis.

16. The coaxial cable assembly of claim 12, wherein said first and second bends in each said coaxial cable accommodates rotation of said flip cover about a second axis.

17. The coaxial cable assembly of claim 11, wherein a slight bend is formed in each of said coaxial cables between said coaxial cable first end and said first bend.

18. The coaxial cable assembly of claim 1, further comprising a cable relief device connected to said support bracket assembly for maintaining the position of each said coaxial cable with respect to said support bracket assembly.

19. The coaxial cable assembly of claim 13, wherein said first bend, said second bend, and said coil of each said coaxial cable is maintained during continuous opening and closing cycles of said flip cover.

20. The coaxial cable assembly of claim 12, wherein said first and second bends of each said coaxial cable have an angle of approximately 90°.

21. The coaxial cable assembly of claim 13, wherein said coil of each said coaxial cable has an angle of approximately 360°.

22. The coaxial cable assembly of claim 17, wherein said slight bend of each said coaxial cable has an angle of approximately 45°.

23. A portable phone, comprising:
  (a) a main housing;
  (b) RF signal circuitry located within said main housing for operating said portable phone in a satellite mode of communication;
  (c) a support bracket assembly detachably coupled to said main housing;
  (d) a flip cover rotatably secured to said support bracket assembly about a first axis and a second axis;
  (e) an antenna system coupled to said RF signal circuitry for transmitting and receiving signals in said satellite mode, wherein said antenna system is integrated with said flip cover; and
  (f) a separate coaxial cable coupled to each antenna element of said antenna system at a first end and to said RF signal circuitry at a second end, each said coaxial cable including a plurality of non-linear portions maintained therein to neutrally position said coaxial cable with respect to said first and second axes so as to minimize bending stresses associated with rotation of said flip cover about said first and second axes.

24. The portable phone of claim 23, wherein the diameter of each said coaxial cable is minimized.

25. The portable phone of claim 23, wherein said non-linear portions in each said coaxial cable are heat formed to maintain shape under continuous cycles of opening and closing of said flip cover.

26. The portable phone of claim 23, wherein each said coaxial cable includes a coil formed therein.

27. The portable phone of claim 26, wherein rotation of said flip cover about said first axis causes said coil in each said coaxial cable to open and close.

28. The portable phone of claim 26, wherein rotation of said flip cover about said second axis causes a compound motion of said coil in each said coaxial cable.

29. The portable phone of claim 23, wherein rotation of said flip cover about said second axis causes a torsional movement in said non-linear portions of each said coaxial cable.

30. The portable phone of claim 23, wherein each said coaxial cable is preformed prior to assembly with said flip cover and said support bracket assembly.

31. A portable phone, comprising:

(a) a main housing;

(b) RF signal circuitry located with said main housing for operating said portable phone in a satellite mode of communication;

(c) a support bracket assembly detachable coupled to said main housing, said support bracket assembly further comprising:
   (1) a support bracket; and
   (2) a hinge mechanism including;
      (a) a yoke having a first bearing at one end, a second bearing at the other end, and a middle portion connecting said first and second bearings having an annular step thereon with an opening therethrough;
      (b) a shaft extending between said first and second yoke bearings; and
      (c) a collar attached to said middle portion of said yoke having an opening therethrough aligned with said step opening through said yoke middle portion;

(d) a flip cover rotatably secured to said support bracket assembly about a first axis and a second axis, wherein said flip cover is retained between said collar and said yoke to rotate about said annular step;

(e) an antenna system coupled to said RF signal circuitry for transmitting and receiving signals in said satellite mode wherein said antenna system is integrated with said flip cover; and (f) means for connecting said antenna system and said RF signal circuitry, said connecting means being configured to minimize bending stresses associated with rotation of said flip cover about said first and second axes.

32. The portable phone of claim 31, wherein said coaxial cable for each antenna element of said antenna system is shaped to pass through said collar opening and said annular step opening and thereafter coiled around said shaft extending between said yoke bearings.

* * * * *